S. S. LILLEY.
CHURN DASHER.
APPLICATION FILED APR. 12, 1917.
1,258,025.
Patented Mar. 5, 1918.
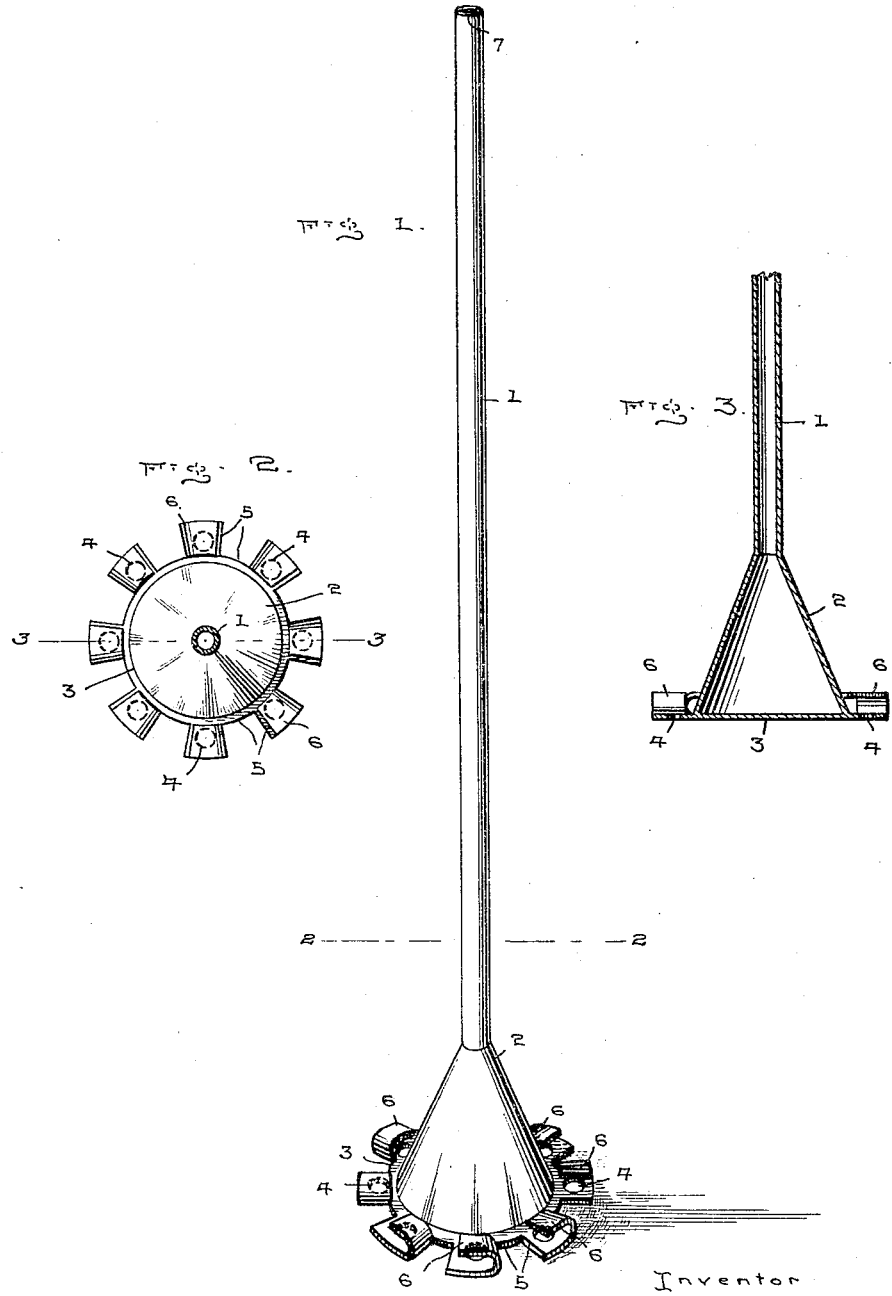

UNITED STATES PATENT OFFICE.

STEAVE SHIRLEY LILLEY, OF FRANCIS, OKLAHOMA.

CHURN-DASHER.

1,258,025.                Specification of Letters Patent.        Patented Mar. 5, 1918.

Application filed April 12, 1917.   Serial No. 161,582.

*To all whom it may concern:*

Be it known that I, STEAVE SHIRLEY LILLEY, a citizen of the United States, residing at Francis, in the county of Pontotoc and State of Oklahoma, have invented certain new and useful Improvements in Churn-Dashers; and I do hereby declare the following to be a full, clear, and exact description of the invention, such as will enable others skilled in the art to which it appertains to make and use the same.

This invention relates to churn dashers, and the primary object of the invention is to provide a churn dasher simple and durable in construction, efficient in operation, and of economical construction.

With these objects in view, the invention consists in the improved construction, arrangement, and combination of parts hereinafter fully described, and afterward specifically claimed.

In order that the construction and operation thereof may be readily comprehended, I have illustrated an approved embodiment of my invention in the accompanying drawings, and will now proceed to fully describe the same, having reference to said drawings, in which—

Figure 1 is a perspective view of one form of the churn dasher.

Fig. 2 is a sectional view on line 2—2 of Fig. 1.

Fig. 3 is a sectional view on line 3—3 of Fig. 2.

Referring to the drawings, 1 denotes the handle of the churn dasher in the form of an open ended tube and secured to the bottom end of the tubular handle 1 is the hollow frusto conical body 2 so that there is communication between the interior of the tubular handle 1 and body 2. Secured to the edges of the base of the frusto conical body 2 is the flat disk 3, the diameter of the disk 3 being sufficiently greater than the diameter of the base of the body 2 so that the outer portions of the disk 3 will project for a distance outwardly of the base of the body 2 and provide a wide annular flange or rim of circular form without projections beyond its circumference.

Formed through the rim of the disk 3 are a plurality of openings 4.

In addition to the provision of the openings 4 in the rim of the disk 3 I make, as shown in Figs. 1, 2, and 3, right angular incisions in that portion of the metal between the openings 4 as indicated at 5 in Figs. 1 and 2 and thereafter bend the cut out portions upwardly and laterally in the circumferential directions of the disk 3 to provide curved deflector plates 6 which over-lie the openings 4 in vertical spaced relation thereto, so that, during the reciprocating movement of the churn dasher the cream which passes to and fro through the openings 4, especially upon the downward movement of the dasher, the cream which is forced through the openings 4 will be driven against the under sides of the deflector plates 6 with such force that it will be deflected in various directions and thereby efficiently agitated.

In operation, my churn dasher is reciprocated as usual in a vertical direction whereby the cream will be forced to and fro through the openings 4 in the rim of the disk 3 and deflected in various directions by coming in contact with the deflector plates 6 and the churning operations continued until the butter is produced.

I form the handle 1 and the body 2 of the churn dasher hollow so that there may be introduced into the body 2 and such portions of the handle 1 as deemed necessary a temperature regulating medium, which may be either hot water or cold water for raising or lowering the temperature of the cream.

Having described my invention, what I claim as new and desire to secure by Letters Patent, is:—

A churn dasher comprising a handle, a disk at the outer end of the handle and forming a horizontal flange projecting peripherally from the handle provided with openings, and having incisions between said openings, and deflectors above said openings consisting of portions of the flange between the openings, bent in circumferential directions over said openings, downwardly curved, and spaced from the openings.

In testimony whereof I have signed my name to this specification in the presence of two subscribing witnesses.

STEAVE SHIRLEY LILLEY.

Witnesses:
  EDWARD A. ERGER,
  EARL NORMAN.

Copies of this patent may be obtained for five cents each, by addressing the "Commissioner of Patents, Washington, D. C."